Nov. 2, 1965     T. SVANOE     3,215,190
PUDDLE LEVEL CONTROL FOR TWIN DRUM DRYERS
Filed May 24, 1963
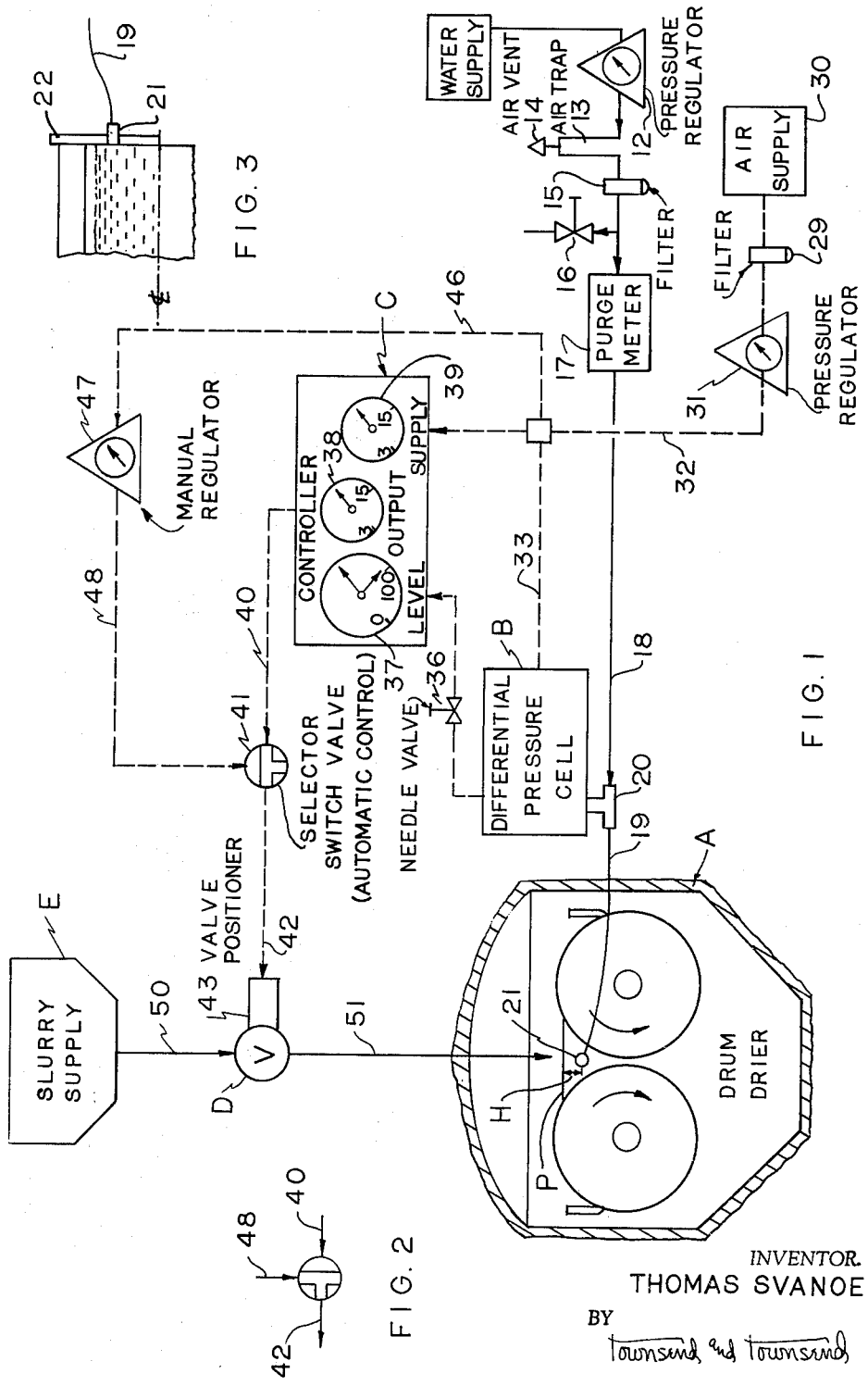
INVENTOR.
THOMAS SVANOE
BY
Townsend and Townsend
ATTORNEYS United States Patent Office 3,215,190
Patented Nov. 2, 1965

3,215,190
PUDDLE LEVEL CONTROL FOR TWIN DRUM DRYERS
Thomas Svanoe, Oakland, Calif., assignor to Gerber Products Company, Fremont, Mich., a corporation of Michigan
Filed May 24, 1963, Ser. No. 283,006
4 Claims. (Cl. 159—44)

This invention relates to a control system for maintaining a relatively constant food slurry puddle level within a food drier.

Food driers are presently used which basically comprise a pair of heated drums which are rotatably mounted between a pair of end walls and adapted to support a puddle of slurry. As these drums rotate in unison, a thin layer of slurry adheres to the outer surfaces, resulting in a continuous removal of slurry from the puddle. The heat of the drums dries the slurry and at a predetermined point doctor blades scrape the thin layer of dried material from the drum surface.

In order to provide uniform slurry removal it is desirable to maintain the slurry puddle depth substantially constant. One way of maintaining the slurry puddle depth constant has been to use a float valve which would measure the slurry surface level and would operate to open and close a slurry supply valve depending upon the position of the float.

A disadvantage of the float valve was that slurry tended to congeal and build up on the float valve surface. The increase in weight caused the float to sink lower in the slurry, thus giving it an inaccurate reading of the level. Another disadvantage was that the system would become unsanitary since the accumulation of the old food particles could pollute or contaminate fresh slurry. Thus frequent cleaning of the float valve was necessary.

In this invention there is provided a slurry level control which includes a differential pressure sensing cell connected to compare the hydraulic head pressure of the slurry puddle against a constant pressure standard and to provide a variable output signal which in turn controls a valve connected to regulate the flow of slurry between a supply source and the slurry puddle, wherein the slurry supply rate increases when the puddle depth falls below a predetermined level or the slurry supply rate decreases when the slurry puddle depth rises above a predetermined level.

Another object of this invention is to provide a puddle level control which includes: a purge line connected for flowing a small quantity of metered fluid into the slurry puddle at a point below the slurry surface; a differential pressure sensing cell connected to measure the hydraulic pressure exerted against this purge fluid flow by the slurry hydraulic head and to compare this measured pressure against a standard pressure for producing a variable output signal proportional to the difference between the purge fluid pressure and the standard pressure; and a slurry flow control valve connected to regulate the rate of slurry addition to the puddle for maintaining the slurry level at a substantially constant level.

A feature and advantage of this invention resides in the fact that the purge fluid flow keeps slurry from congealing and accumulating at the pressure sensing head thereby maintaining accurate measurements over a long period of time without the need for cleaning the measuring device.

Another feature of this invention resides in the fact that the purge fluid is very pure and will not contaminate the slurry and that the amount of purge fluid flowed into the slurry puddle is sufficiently small to maintain the slurry in a substantially undiluted state.

Another object of this invention is to provide a pressure sensing means for the above-discussed control in which a constant rate flow of purge fluid is connected to enter the puddle at a level substantially below the puddle surface for providing a pressure signal between an upper and lower range which is directly proportional to variations in puddle surface level.

Another object of this invention is to provide a control including a differential pressure cell connected for measuring the hydraulic head back pressure on a constant flow of purge fluid to provide a variable pressure output signal which in turn regulates a heavy duty output signal having a pressure substantially equal to the differential pressure cell output signal; this heavy duty signal is in turn connected to a slurry flow control valve for regulating the rate of slurry feed to the slurry puddle in a drier.

Other objects and advantages of this invention will become apparent upon reading the following detailed description and referring to the attached drawing in which:

With reference to the accompanying drawing: FIG. 1 shows a schematic diagram of the slurry puddle level control of this invention adjusted for automatic operation; FIG. 2 shows the position of the selector switch of FIG. 1 for manual operation of the system; and FIG. 3 is a schematic side segment of the drum drier portion of the apparatus of FIG. 1 illustrating the manner of connection between the purge line and the slurry puddle.

Generally the system senses variations in the puddle depth H to regulate the rate of slurry supply flow through control valve D. In order to provide an analog measurement of the puddle depth H, a purge line 19 is connected to food drier A at a point substantially below the surface of puddle P. A differential pressure cell B is connected to purge line 19 and senses hydraulic back pressure exerted on the purge fluid by the slurry puddle P. By comparing this variable purge pressure with a constant pressure standard connected to cell B from air pressure supply 30, a variable output signal which is proportional to the difference between the pressure standard and the purge fluid back pressure is produced on line 33. This differential output signal is connected to regulate the output from controller C to a slurry flow control valve D. Thus the rate of slurry flow into drier A is automatically controlled to ideally maintain the level of puddle P constant.

Referring more specifically to the drawing, a pressurized supply of pure purge water is metered to flow into the slurry puddle at a constant predetermined rate. This supply water is maintained at a constant pressure of 20 p.s.i. by the regulator 12. In order to insure that air does not accumulate in the purge water line, a U-shaped air trap 13 projects vertically upward having an apex at a relatively higher level than any other point in the purge line. Air which accumulates here can be released into the atmosphere by actuating an air vent 14 which communicates with the air trap apex thus eliminating air from the line. As a means for keeping the purge water free from impurities which could contaminate the food slurry or obstruct the purge line, a filter 15 is connected in the pressure line to trap these particles. As an added safeguard against air accumulating in the pressure line, a bleed valve 16 is connected to be opened and closed to permit escape of both air and water until the flow of water is constant.

This pressurized flow of pure purge water is then accurately metered into a constant flow rate by the purge meter 17. Since it is only necessary to provide enough purge water to keep purge lines 18 and 19 free of slurry and to maintain the purge outlet into the drier puddle open at all times, the rate of purge water flow is relatively minute; for instance, on the order of a few cubic centimeters an hour. As the metered purge water flows through purge line 18 to the T-connection 20 between differential pressure cell B and the second purge line 19, it branches and communicates with both differential pressure cell B and drier A. That portion of the purge water which communicates with the differential pressure cell B can be thought of as trapped static water while that portion of purge water in line 19 flows dynamically through the connection 21 on the endboard 22 of the food drier A. FIG. 3 illustrates the manner in which the line 19 communicates with the puddle of slurry disposed between the drums of food drier A. As there shown, line 19 communicates with the puddle through connection 21 on end board 22.

The hydraulic pressure head H caused by the weight of the slurry is exerted against the dynamic purge water to set up a back pressure in lines 18 and 19 which is directly proportional to the height of the slurry head. Since changes in this head pressure do not affect the constant rate of flow from purge meter 17, the back pressure sensed by the differential pressure cell B is directly proportional to the puddle depth.

Differential pressure cell B is a conventional type having a diaphragm actuated means in which purge water back pressure is exerted against a constant pressure standard to provide a variable output signal which is directly proportional to the difference between the pressure standard and the variable purge back pressure. Rather than rely on fluctuating atmospheric pressure, the air pressure standard supply 30 is connected to differential pressure cell B by means of pressure regulator 31 and supply lines 32 and 33. By so using a pressure standard, pressure differential cell B can measure a full range of depths between upper and lower limits, from some depth H where the average hydraulic pressure is substantially greater than the limit ranges. That is, the full sensitivity range of the differential pressure cell B may be analogous to a five inch depth variation while the depth H at which the purge line is connected may be one foot or more. Thus even if the puddle surface drops five inches, the inlet connection 21 is still substantially below the puddle surface.

By comparing the pressure standard with the purge fluid back pressure, a variable differential pressure output signal is fed through line 35 connected between the differential pressure cell B and controller C. As a means for dampening surges and oscillations in the differential output signal resulting from rapid changes in hydraulic head pressure, a needle valve 36 is connected in differential output line 35. This restricts the flow of differential output air during rapid changes to thus prevent system oscillations which could be caused by variations in response time between portions of the system.

The constant pressure air supply 30 which is connected to the controller C through air supply line 32 is regulated by the variable output signal of the differential pressure cell by means of conventional valving arrangement. This regulation results in a variable control valve output air pressure signal on line 40 which is substantially equal to the variable output of the differential pressure cell B.

In order to provide a check to make sure that the system is functioning properly, three gauges are provided on the face of controller C. Control gauge 37 measures the variable air pressure signal from the differential pressure cell B, while gauge 38 measures the control valve output signal on line 40. By comparing the two pressure levels on gauges 37 and 38, it is possible to easily determine whether the output signal and the differential pressure signal are equal. In addition, gauge 37 can be calibrated to give a reading of the puddle depth or level. As a means for insuring that the pressure standard is functioning properly, an air supply gauge 39 is also connected or included on the pressure gauge face.

In order to control the rate of slurry flow from tank E, an air pressure actuated throttling valve D is connected between the conduits 50 and 51. As the output signal on line 40 from controller C flows through the three-way selector switch valve 41 and line 42 to flow control valve D, the slurry flow is restricted in direct proportion to the air pressure level on line 42. The "selector switch valve" is given this name because it is descriptive of the function of the valve, i.e. the switch valve 41 "selects" whether the regulation of the rate of flow of the slurry is "manual" or "automatic" as will be explained hereinafter. Thus with a full upper limit pressure of 17 p.s.i. on line 42, flow control valve is fully open. With a lower level pressure of 3 p.s.i. on line 42, the valve is fully closed. With pressures between these upper and lower limits, the size of the valve opening varies in direct proportion to the signal pressure. By connecting a valve positioning mechanism 43 with valve D, the valve opening will be exactly the same each time the same control pressure is received on line 42, thus insuring precise operation.

In operation it thus can be seen that variations in the hydraulic head H of slurry puddle will cause variations in the purge water back pressure. This results in a variation in the output from the differential pressure cell B which in turn regulates the valve control air pressure on lines 40 and 42. Ideally the system should be sufficiently sensitive to variations in puddle depth to maintain the puddle at a constant level. Thus as the two heated drums rotate and remove a thin sheet of slurry from the puddle which is thereafter cut off by a blade, the throttling valve D should be opened sufficiently to add slurry to the puddle at the same rate that it is being removed. Even with decreased system response speed and sensitivity, the puddle level would be maintained relatively constant. Thus, puddle level could be maintained within a given range at all times.

The three-way switch valve 41 permits manual control of the throttling valve in cases where a malfunction results in the puddle rising above or falling below safe depths. As illustrated, the switch valve 41 is in a position which connects controller C directly to the slurry flow control valve D. This position is shown in FIG. 1 of the drawing and is denoted "automatic control" position. By turning the valve 90 degrees clockwise to the second position, controller C is disconnected and air supply line 30 is connected to regulate flow control valve D. This second or "manual control" position is illustrated in FIG. 2 of the drawing. As a means for adjusting the pressure on line 48, a manual regulator 47 is connected with the 20 p.s.i. air supply line 32 by air hose 46. Thus an operator can raise and lower the puddle to any level from empty to overflowing by by-passing the automatic control. Or in turn he may preset the slurry flow at any given rate from the cut-off to full flow.

Although the foregoing invention has been described in some detail by way of illustration and example for purposes of clarity and understanding, it should be understood that certain changes and modifications can be practiced within the spirit of the invention as defined by the scope of the appended claims.

What is claimed is:

1. In a food drier of the type having a pair of adjacent parallel rotatable drums and a pair of end walls defining a reservoir between the end walls and the top of the drums, a puddle level control comprising: a feed slurry supply conduit for depositing a slurry puddle in said reservoir, a second conduit exteriorly of said reservoir in liquid communication with the lower part of said reservoir through one of said end walls, means for unidirectionally flowing a purging liquid through said second conduit at a constant rate into said reservoir, said rate being sufficient to prevent back up of slurry into said second conduit from the reservoir a differential pressure cell connected in purging liquid communication to said second conduit operable to sense pressure changes in the second conduit caused by a change in the level of the slurry in said reservoir, a source of constant air pressure connected to said differential pressure cell, said differential pressure cell being operative to provide an output signal having a magnitude proportional to the difference between the pressure in said second conduit and the pressure reference of said constant air pressure source, valve means in said feed slurry supply conduit, and means responsive to said output signal operable to move said valve means towards open position at output signals generated by a lowering of the slurry level in said reservoir.

2. The automatic control of claim 1 in which the control valve means includes a valve positioner connected to move the control valve means to substantially the same position each time the same signal is received.

3. The automatic control of claim 1 including a puddle level gauge connected to sense the differential output pressure signal to give an instantaneous reading of the puddle depth.

4. An improved liquid level control for a body of liquid subject to fluctuation in level comprising: means for supplying a stream of feed liquid to said body, a valve controlling the flow of feed liquid through said supplying means in response to predetermined signals, a conduit having an opening communicating with said body of purging liquid below its surface, means for unidirectionally flowing purging liquid through said conduit at a constant rate into said body of liquid, said rate being sufficient to prevent back up of liquid into said conduit, a differential pressure cell connected in purging liquid communication with said conduit to sense pressure changes in the conduit caused by a change in the level of the liquid in said body of liquid, a source of constant air pressure connected to said differential pressure cell, said differential pressure cell being operative to provide an air output signal having a magnitude proportional to the difference between the pressure in said conduit and the pressure of said constant air pressure source, and means for actuating said feed controlling valve including a conduit to connect said controlling valve in fluid communication with said air output signal, the controlling valve for said supply liquid being of the type that opens and closes in proportion to the pressure magnitude of said air output signal.

References Cited by the Examiner
UNITED STATES PATENTS

| | | | |
|---|---|---|---|
| 2,409,768 | 10/46 | Lavett et al. | |
| 2,576,496 | 11/51 | Ziegler | 159—44 X |
| 2,598,345 | 5/52 | Brown | 159—44 X |
| 2,658,516 | 11/53 | Luppold et al. | 159—44 |
| 2,743,710 | 5/56 | Shannon | 159—44 |
| 2,745,484 | 5/56 | Eckstrom et al. | 159—44 |
| 2,859,809 | 11/58 | Ehrisman | 159—44 X |

OTHER REFERENCES

"Integrated Control System" by A. G. Camp from publication "Sugar", June 1950, pp. 26 and 27.

NORMAN YUDKOFF, *Primary Examiner.*